(12) United States Patent
Kuningas

(10) Patent No.: US 9,088,915 B2
(45) Date of Patent: Jul. 21, 2015

(54) METHOD FOR CONFIGURING THE LINK MAXIMUM TRANSMISSION UNIT (MTU) IN A USER EQUIPMENT (UE)

(75) Inventor: Tarmo Kuningas, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1703 days.

(21) Appl. No.: 12/531,722

(22) PCT Filed: Feb. 5, 2008

(86) PCT No.: PCT/SE2008/050142
§ 371 (c)(1),
(2), (4) Date: May 10, 2011

(87) PCT Pub. No.: WO2008/115124
PCT Pub. Date: Sep. 25, 2008

(65) Prior Publication Data
US 2011/0243063 A1   Oct. 6, 2011

(30) Foreign Application Priority Data

Mar. 22, 2007   (SE) ...................................... 0700725

(51) Int. Cl.
  H04W 4/00      (2009.01)
  H04W 28/16     (2009.01)
  H04L 12/805    (2013.01)
  H04W 80/04     (2009.01)
  H04W 80/06     (2009.01)
  H04W 84/04     (2009.01)
  (Continued)

(52) U.S. Cl.
  CPC ............... *H04W 28/16* (2013.01); *H04L 47/36* (2013.01); *H04L 69/166* (2013.01); *H04L 69/16* (2013.01); *H04W 28/02* (2013.01); *H04W 80/04* (2013.01); *H04W 80/06* (2013.01); *H04W 84/042* (2013.01)

(58) Field of Classification Search
  CPC ....................................................... H04W 80/04
  USPC ................. 370/338, 337, 339, 328, 329, 330; 455/517, 219, 225, 551, 560
  See application file for complete search history.

(56) References Cited

U.S. PATENT DOCUMENTS 6,922,548 B1   7/2005 Moore et al.
7,957,430 B2 *  6/2011 Kashima et al. .............. 370/470
(Continued)

FOREIGN PATENT DOCUMENTS

EP   1381200 A1    1/2004
GB   2398699 A  *  8/2004
(Continued)

OTHER PUBLICATIONS

3GPP TS 25.309 V6.6.0 (Mar. 2006), 3rd Generation Partnership Project; Technical Specification Group Radio Access Network; FDD Enhanced Uplink; Stage 2 (Release 6) pp. 1-34.*
(Continued)

*Primary Examiner* — Brandon Renner
*Assistant Examiner* — Abdelnabi Musa
(74) *Attorney, Agent, or Firm* — Coats & Bennett, PLLC

(57) ABSTRACT

In a System Architecture Evolution/Long Term Evolution (SAE/LTE) radio network, the network is set to configure the link MTU in the UE for each bearer where the network-configured link MTU can represent an MTU of a path for a SAE bearer service in complete or part of a particular SAE/LTE network.

14 Claims, 2 Drawing Sheets

(51) Int. Cl.
*H04L 29/06* (2006.01)
*H04W 28/02* (2009.01)

(56) References Cited

U.S. PATENT DOCUMENTS

| | | | |
|---|---|---|---|
| 2004/0218550 A1 | 11/2004 | Kim | |
| 2005/0111437 A1* | 5/2005 | Maturi | 370/352 |
| 2006/0045131 A1* | 3/2006 | Pancholi et al. | 370/472 |
| 2006/0234716 A1* | 10/2006 | Vesterinen et al. | 455/450 |
| 2007/0171828 A1* | 7/2007 | Dalal et al. | 370/235 |
| 2007/0258429 A1* | 11/2007 | Doetsch et al. | 370/338 |
| 2008/0181149 A1* | 7/2008 | Jiang | 370/310 |
| 2008/0310378 A1* | 12/2008 | Kitazoe et al. | 370/338 |
| 2009/0201828 A1* | 8/2009 | Samuels et al. | 370/252 |

FOREIGN PATENT DOCUMENTS

| | | | |
|---|---|---|---|
| JP | 2006157544 A | 6/2006 | |
| RU | 2258251 C2 | 8/2005 | |
| WO | 2005054986 A1 | 6/2005 | |

OTHER PUBLICATIONS

NTT Docomo; "Impact of IP Fragmentation in E-UTRAN Interfaces"; 3GPP TSG-RAN3#55; Feb. 12-15, 2007, pp. 1-3; R3-070080; 3GPP St. Louis, Missouri, USA.

3rd Generation Partnership Project. "IP Fragmentation." 3GPP TSG-RAN WG3 #55bis, R3-070616, St. Julian, Malta, Mar. 27-30, 2007/.

Mogul, J. et al. "Path MTU Discovery." Internet Engineering Task Force, Network Working Group, Request for Comments: 1191, Obsoletes: RFC 1063, Nov. 1990.

3rd Generation Partnership Project. 3GPP TR R3.018, V0.7.1 (Feb. 2007). 3rd Generation Partnership Project, Technical Specification Group Radio Access Network; Evolved UTRA and UTRAN; Radio Access Architecture and Interfaces (Release 7), Feb. 2007.

* cited by examiner

METHOD FOR CONFIGURING THE LINK MAXIMUM TRANSMISSION UNIT (MTU) IN A USER EQUIPMENT (UE)

TECHNICAL FIELD

The present invention relates to methods and arrangements in a telecommunication system, in particular to methods and arrangements for network-controlled configurations of the link maximum transmission unit (MTU) in a user equipment (UE).

BACKGROUND

Within the 3rd Generation Partnership Project (3GPP) work is currently ongoing on UTRAN long term evolution (LTE). System Architecture Evolution/Long Term Evolution (SAE/LTE) architecture that moves PDCP, user plane ciphering and header compression to the enhanced Node B (eNB) changes the needs for handling the length of S1-U (and X2-U) frames as the length of the S1-U (and X2-U) frame then is considerably increased. Therefore appropriate solutions to deal with the length of Maximum Transmission Unit (MTU) are necessary. At the same time capabilities to minimise the probability of S1-U frame being fragmented have been somewhat increased.

The following problems relate to fragmentation:

Transport overhead: Every fragment includes an additional IP header; hence it adds additional transmission overhead. It is 20 octets (though depending on the usage of optional headers) per fragment and in case of IPv4 and, in case of IPv6, 48 octets (i.e. 40 octets of standard IPv6 header plus 8 octets of the fragment header). A typical transport layer datagram would be carried in 2 fragments. Therefore, a selection of length of transport layer datagram so that it fits into single IP packet provides significantly lower aggregate overhead.

Incomplete discard: In case packets are discarded due to congestion it is very likely that fragments of the same datagram are discarded independently. Hence transport network resources are used to forward data that will be discarded at the receiver, the Serving Gateway (SGW) or eNB. In case of severe congestion it could lead to further discarding and hence more incomplete datagrams.

Processing efficiency: It is generally accepted that the S1 interface is the bottleneck. Therefore considerable packet loss and delay variation could be present for interactive and best effort flows even in a normal condition in order to maximise the end-user perceived data rate and utilisation of scarce S1 resources. This may require significant processing effort and relatively long-term memory reservation for reassembly of the original datagrams in the receiver as the reassembly buffers have to be allocated for at least for the length of perceived delay variation on the applicable transmission path.

Security threat: It should be noted that typical implementations assume that only fraction of datagrams are fragmented and, if the datagrams are fragmented, the fragments arrive with very short interval. That allows for limitation of the memory required for reassembly. Therefore, transmission of incomplete datagrams is a common way to introduce denial of service attacks as scarce reassembly buffers are consumed for extensive periods and legitimate fragmented datagrams could be discarded due to lack of reassembly buffers/engines. Although this is not really a problem for (logical) SGW and eNB as those nodes use secure network, it could be a problem for security gateways (SEG) in case the fragmentation is performed on the path between SEG-s.

False reassembly: The identification header used for reassembly is only 16 bits in case of IPv4 (32 bits in case of IPv6). Considering the peak data rate, measured in packets per second, there is high probability of the wrap around of the ID and therefore incorrect reassembly (though this also depends on the setting of the reassembly timer at the receiver). The false reassembly results in at least further data loss that may be detected by the receiver or even an integrity (and potentially confidentiality) violation.

Hence there exists a need for a system architecture that removes or at least reduces the problems relating to fragmentation.

SUMMARY

The path MTU, i.e. the path between application server and the UE in an LTE network, such as the network depicted in FIG. 1, is affected by numerous events. Every link in the IP network has a defined Maximum Transmission Unit (MTU), and so does the link that is used by the IP Host in the UE. It has been observed to be a problem how to configure the link MTU in the UE. Generally, any "reasonable" default value that is updated with path MTU discovery could be initially used.

However, it should be noted that there are number of configurations/implementations (for instance of firewalls/gateways) that discard a number of IPv4 ICMP messages including "Packet Too Big" messages. Hence, it can be assumed that end-to-end path MTU discovery is not used in case of IPv4. This in turn leads to a fragmentation in the network and all the problems associated with such fragmentation.

In order to overcome the identified problems, the network is set to configure the link MTU in the UE for each bearer where the network-configured link MTU could represent an MTU of a path for a SAE bearer service in complete or part of a particular SAE/LTE network.

When the SAE/LTE nodes are made aware of the MTU supported in the SAE/LTE network, the network can be adapted to configure the link MTU in the UE so that the fragmentation in the SAE/LTE network can be avoided or at least the probability reduced significantly. If that MTU is made available to the host in the UE, the stack in the UE is enabled to provide the following behaviour that reduces the need for fragmentation in the network significantly:

in case of transport layer protocol that has a Maximum Segment Size (MSS), e.g. Transmission Control Protocol (TCP) or Stream Control Transmission Protocol (SCTP), both the transmit and receive MSS can be selected by the UE considering the link MTU configured by the network and hence fragmentation can be avoided altogether (or at least in the SAE/LTE network domain); In case of TCP receive MSS can be signalled to the peer in SYN and SYN ACK messages at the establishment of the TCP connection.

in case of a transport layer protocol that does not have a Maximum Segment Size (MSS), e.g. UDP, the UE may fragment the transmitted datagram at the source according to the link MTU configured by the network and hence fragmentation can be avoided at least in the uplink direction.

The invention also extends to nodes in a SAE/LTE network configured to transmit the link MTU to a UE and also to a UE configured to receive the link MTU and to base transmission on the link MTU.

Hence in accordance with the present invention the MTU supported by the SAE/LTE network is signalled to the UE.

One advantage of the present invention is that the UE is enabled to use the optimised MTU for SAE/LTE network without adding significant additional complexity. Furthermore, allowed time-constraints for an increase of the MTU via path MTU discovery effectively do not allow to take advantage of changes in path MTU due to mobility (i.e. the evolved Node Bs (eNB-s) between which the UE is moving may be connected to different IP networks with different MTU). Handovers are considered in a mobile network significantly more frequently than defined timing constraints for path MTU discovery.

DETAILED DESCRIPTION

Figure 1:
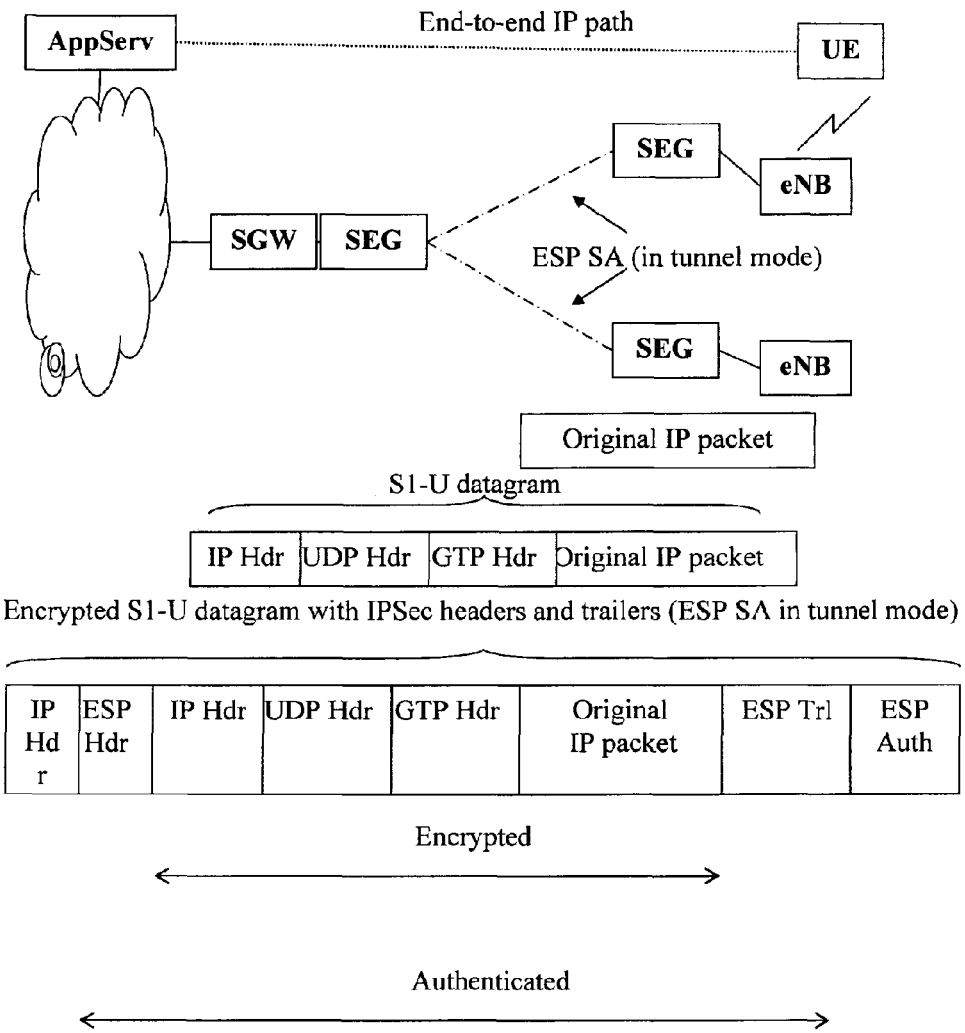
FIG. 1 illustrates the impact on the path MTU from SAE/LTE protocol architecture on S1-U.

As mentioned above, the path MTU, i.e. the path between application server and the UE, as depicted e.g. in FIG. 1, can be affected by numerous impacts including:

Uncompressed header of original (i.e. end-to-end user) IP-packets;
The S1-U tunneling protocol (GTP-U);
IPSec tunnel (Encapsulating Security Payload (ESP) Security Association (SA) in tunnel mode) for integrity and confidentiality protection in the access network between security gateways (SEG);
An MTU provided by the data link layer on particular instance of S1 interface;
An MTU imposed on a particular administrative (and QoS) domain of the IP network;
The used version of the Internet Protocol (i.e. IPv4 or IPv6).

Aspects described in some of the problems above could introduce a variable path MTU primarily due to user mobility. Another source of variable path MTU can be link failures and the following re-routing in the IP network.

Moreover, it is very likely that the SAE/LTE network has the shortest MTU on the end-to-end path.

Every link in the IP network has a defined MTU, and so does the link that is used by the IP Host in the UE. It has been observed to be a problem how to configure the link MTU in the UE. Generally, any reasonable default value that is updated with path MTU discovery could be initially used. However, it should be noted that there are number of configurations/implementations (for instance of firewalls/gateways) that discard the number of IPv4 ICMP messages including "Packet Too Big" type of messages. Hence, it can be assumed that end-to-end path MTU discovery is not used in case of IPv4. This in turn leads to a fragmentation in the network and all the problems associated with such fragmentation. The fragmentation in case of a deployment as illustrated in FIG. 1 can occur on different levels including fragmentation of end-to-end datagram, fragmentation of S1-U datagram, fragmentation of IPSec tunnel datagram.

If the SAE/LTE nodes are made aware of the MTU supported in the SAE/LTE network, the network is enabled to configure the link MTU in the UE such that the fragmentation in the SAE/LTE network can be avoided or at least significantly reduced. If this MTU is available to the host in the UE, the stack in the UE is able to provide the following behaviour for reducing the need of fragmentation in the network:

In case of a transport layer protocol that has a Maximum Segment Size MSS e.g. TCP both the transmit and receive MSS can be selected by the UE considering the "link" MTU configured by the network and, hence, fragmentation can be avoided altogether or at least in the SAE/LTE network domain.

In case of a transport layer protocol that does not have a Maximum Segment Size (MSS) e.g. UDP the UE can fragment the transmitted datagram at the source according to the "link" MTU configured by the network and, hence, fragmentation can be avoided at least in the uplink direction.

In accordance with the present invention the MTU supported by the SAE/LTE network is signalled to the UE.

The following describes by means of non-exclusive examples different embodiments for signalling of the link MTU.

Figure 2:
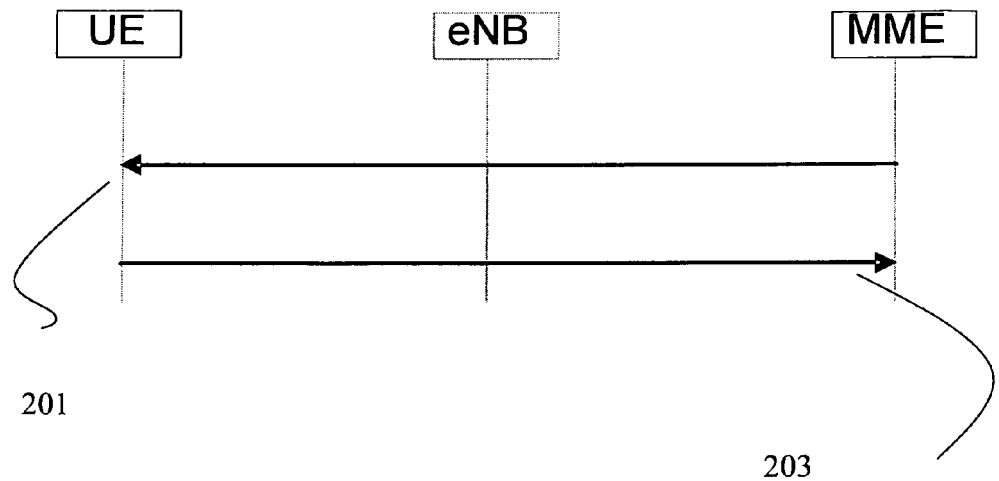
FIG. 2 illustrates SAE bearer establishment/modification.

In accordance with a first embodiment the link MTU is signalled in a Non Access Stratum (NAS) message from the Mobility Management Entity (MME). As the signalled link MTU conceptually represents the MTU supported by the SAE bearer service it is expressed explicitly. The NAS signalling for SAE bearer establishment and modification is illustrated in FIG. 2. Hence first in a message 201 a Non Access Stratum (NAS) message from the Mobility Management Entity (MME) including a SAE Bearer Setup/Modification Request and the link MTU. In response to the message 201 the UE transmits a NAS message 203 acknowledging that the SAE Bearer Setup/Modification is completed.

In accordance with one embodiment of the present invention, the MME signals in the NAS SAE bearer setup/modification request message (or a similar message) signals the link MTU that can represent an MTU of a path for a SAE bearer service in a complete or in a part of a particular SAE/LTE network. The signalled link MTU can for instance be set to the highest value supported by the SAE/LTE network such that the network does not need to perform IP fragmentation of the original end-to-end datagram or any of the (nested) tunneling datagrams encapsulating the end-to-end datagram. Once the UE receives the link MTU for a particular SAE bearer at SAE bearer establishment or modification, the UE can apply the signalled link MTU for the particular SAE bearer.

In accordance with another embodiment of the present invention, the link MTU is signalled in a Radio Resource Control (RRC) message from an evolved Node B (eNB). The signalled link MTU can for example be part of the radio bearer establishment/modification procedure and can, then, only implicitly represent the MTU supported by the SAE bearer service.

Figure 3:
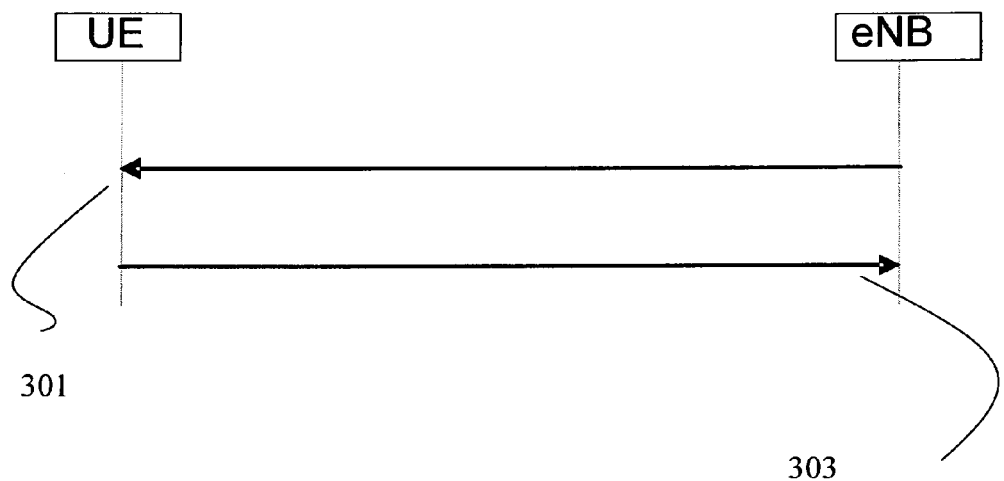
FIG. 3 illustrates radio bearer establishment/modification.

The RRC signalling for Radio bearer establishment and reconfiguration is illustrated in FIG. 3. In accordance with one embodiment of the present invention, the eNB signals in the RRC Radio bearer setup/reconfiguration request message 301 (or a similar message) the link MTU that can implicitly represent an MTU of a path for SAE bearer service in a complete or in a part of a particular SAE/LTE network as known to an eNB. The signalled link MTU can for instance be set to the highest value supported by the SAE/LTE network so that the network does not have to perform IP fragmentation of the original end-to-end datagram or any of the (nested) tunneling datagrams encapsulating the end-to-end datagram. Once the UE receives the link MTU for a particular radio bearer at Radio bearer establishment or reconfiguration, the UE is preferably set to apply the signalled link MTU for the particular SAE bearer. Also in response to the message 303 the UE acknowledges that the Radio Bearer Setup/Reconfiguration is completed.

When configuring a domain MTU in the SGW and the eNB, the link MTU is also a property of the administrative domain the link belongs to. Typically this will result in that the least capable link defines the MTU for the complete domain. In addition, it can be assumed that very short MTU-s are not used in modern IP networks. Therefore, the minimum link MTU of S1-U (X2-U) can be generally assumed to be in about 1500 octets minus the applicable overhead. In accordance with one embodiment of the present invention, the eNB-s having defined X2-interfaces between themselves are set to belong to the same administrative domain of an IP network. Similarly the corresponding S1-U instances in the UPE are preferably made part of the same administrative domain.

Moreover, in order to avoid small variations of the MTU that can result in worse performance in order to gain a few octets for specific link, it is preferred to configure the MTU of the administrative domain for each corresponding link in the eNB and the UPE. One reason to configure the MTU of the administrative domain for each corresponding link in the eNB and the SGW is because a "too big packets" functionality may be implemented in eNB and UPE as is described below.

There are three fragmentation methods:

Fragmentation of end-to-end IP packet: This option is possible only in case of IPv4 and only in case the "do not fragment" (DF) bit has not been set. However, there are number of implementations that do fragmentation even if the DF bit has been set. Fragmentation when the DF bit has been set is for example sometimes used to overcome the limitations to run path MTU discovery in IPv4 networks.

The benefit of using the fragmentation of end-to-end IP packet, independent of setting of DF bit as described above, is that the reassembly is pushed to the end-hosts and hence network resources are not spent on reassembly. This is applicable only in case SGW and eNB are configured with the link MTU that corresponds to the S1-U (X2-U) path MTU or if path MTU discovery is used on S1-U (X2-U). Additionally, the hosts terminating the end-to-end flow may do the fragmentation/reassembly by themselves according to the link MTU configured for the link associated with the hosts.

Fragmentation of S1-U (X2-U) tunneling IP-packets: If fragmentation is a solution used to handle "too big packets" then fragmentation of S1-U (X2-U) tunneling IP-packets is a preferred option if end-to-end flow is IPv6 flow. It may also be applied in case of IPv4 end-to-end flows. Furthermore, the fragmentation may be left to the node that interfaces the link with the lowest MTU on the S1-U (X2-U) path in case of IPv4 path on S1-U (X2-U). In case S1-U (X2-U) is IPv6 path then the fragmentation can be performed by the eNB/SGW. However, it should be noted that the most processing and memory intensive process is reassembly and it is therefore performed in eNB/SGW and for very large number of flows.

Fragmentation of IPSec tunneling IP-packet: The principle is almost the same as for fragmentation of S1-U (X2-U) tunneling IP-packets. However, one difference is that the reassembly has to be performed in a security gateway (SEG) while the fragmentation may be performed in the node that interfaces with the link with the lowest MTU on the S1-U (X2-U) path in case of IPv4 IPSec tunnel while it has to be performed by the SEG in case of IPv6 IPSec tunnel.

Moreover, MTU discovery can be divided into different types of MTU discovery, namely end-to-end path MTU discovery, S1-U (X2-U) path MTU discovery, and SEG-to-SEG path MTU discovery.

For end-to-end path MTU discovery the IP hosts terminating the end-to-end IP flow may run Path MTU discovery. However, it should be noted that there are number of configurations/implementations (of firewalls/gateways) that discard the number of IPv4 ICMP messages including "Packet Too Big" messages. Hence it can be assumed that end-to-end path MTU discovery is not used in case of IPv4.

On the other hand in case of IPv6, hosts have the two options either to use MTU of 1280 octets (i.e. the minimum MTU each IPv6 capable node has to support) or to use end-to-end path MTU discovery. Considering the problems related to path MTU discovery for TCP it is preferred to apply common S1-U (X2-U) path MTU in the complete administrative domain of eNB-s anyway in order to avoid change of end-to-end path MTU due to mobility. It should be noted that if common MTU is not applied in the administrative domain of eNB-s then allowed time-constraints for increase of MTU effectively disable the gains from "variable" MTU in the administrative domain as the handovers are several magnitudes more frequent.

For S1-U (X2-U) path MTU discovery, the eNB and SGW may use path MTU discovery instead of administratively configured S1-U (X2-U) path MTU. As S1-U (X2-U) are defined to use trusted networks, it can also be assumed that the operator has direct or indirect control over the handling of ICMP messages and hence path MTU discovery can be used independent of version of IP used for S1-U (X2-U) tunneling.

For SEG-to-SEG path MTU discovery, the SEG may use path MTU discovery instead of administratively configured tunnel MTU. However it may only be used in case of IPv6 IPSec tunnel as it can not rely on the "Packet Too Big" ICMP messages in case of IPv4 tunnel.

The eNB may be configured with the link MTU according to the MTU of the administrative domain it belongs to. Furthermore, it could be considered that the MME is aware of the configured link MTU in the eNB. If that MTU would be available to the host in the UE, the IP stack in the UE can provide the following behaviour that reduces the need for fragmentation in the network significantly.

In case of a transport layer protocol that has a MSS, e.g. TCP, both the transmit and receive MSS can be selected by the UE considering the "link" MTU configured by the network and hence fragmentation can be avoided altogether (or at least in the SAE/LTE network domain). In case of a transport layer protocol that does not have MSS, e.g. UDP, the UE may fragment the transmitted datagram at the source according to the "link" MTU configured by the network and hence fragmentation can be avoided at least in the uplink direction.

Considering the gains provided by configuring the "link" MTU in the UE according to the MTU of the administrative domain the eNB belongs to where the SAE bearer is established to the UE, it is recommended to provide functionality to configure the "link" MTU at the establishment/modification of SAE bearer (e.g. included in NAS: SAE bearer establishment/modification) according to the S1-U path MTU known to the MME for respective eNB.

The invention claimed is:

1. A method of configuring the link maximum transmission unit (MTU) in a user equipment (UE) adapted to connect to a System Architecture Evolution/Long Term Evolution (SAE/LTE) radio network, said method comprising the step of signaling the MTU supported by the SAE/LTE network to the UE in one of a Non Access Stratum (NAS) message including a bearer setup/modification request from a Mobility Management Entity (MME) and a Radio Resource Control (RRC) bearer setup/reconfiguration request message from an evolved Node B (eNB).

2. The method according to claim 1, when a transport layer protocol of the link has a Maximum Segment Size (MSS), and wherein the transmit or the receive MSS are selected based on the MTU signaled to the UE.

3. The method according to claim 2, wherein the transport layer protocol supports signaling of receive MSS and selection of transmit MSS.

4. The method according to claim 2, wherein the transport layer protocol is Transmission Control Protocol (TCP) or Stream Control Transmission Protocol (SCTP).

5. The method according to claim 1, when a transport layer protocol of the link lacks signaling of receive Maximum Segment Size (MSS), and wherein the UE is configured to allow fragmentation of a transmitted datagram at the source based on the MTU signaled to the UE.

6. The method according to claim 5, wherein the transport layer protocol is UDP.

7. The method according to claim 1, wherein the signaled link MTU is set to the highest value supported by the SAE/LTE network.

8. A user equipment (UE) adapted to connect to a System Architecture Evolution/Long Term Evolution (SAE/LTE) radio network, said UE comprising a receiver configured to receive data comprising the link maximum transmission unit (MTU) supported by the SAE/LTE network in either a Non Access Stratum (NAS) message that includes a bearer setup/modification request or a Radio Resource Control (RRC) bearer setup/reconfiguration request message.

9. The user equipment (UE) according to claim 8, comprising a processor configured to select a transmit and/or receive Maximum Segment Size (MSS) of the transport layer protocol based on the MTU signaled to the UE.

10. The user equipment (UE) according to claim 8, comprising a processor configured for fragmentation of a transmitted datagram at the source based on the MTU signaled to the UE.

11. A node in a System Architecture Evolution/Long Term Evolution (SAE/LTE) radio network, comprising a transmitter configured to signal the MTU supported by the SAE/LTE network to a User Equipment (UE) connected to the network, said transmitter configured for one of signaling the link MTU in a Non Access Stratum (NAS) message including a bearer setup/modification request and signaling the link MTU in a Radio Resource Control (RRC) bearer setup/reconfiguration request message.

12. The node according to claim 11, comprising a processor configured to set the signaled link MTU to the highest value supported by the SAE/LTE network.

13. A method in a User Equipment (UE), said method comprising:
  receiving a Non Access Stratum (NAS) message including a bearer setup/modification request or a Radio Resource Control (RRC) bearer setup/reconfiguration request message from a supporting communication network, said message indicating a link Maximum Transmission Unit (MTU); and
  configuring a link MTU in the UE according to the indicated link MTU.

14. The method of claim 13, wherein configuring a link MTU in the UE comprises performing at least one of:
  for transport layer protocols that have a Maximum Segment Size (MSS), selecting transmit and receive MSSs according to the MTU, to avoid packet fragmentation at least with respect to transmissions between the UE and a domain of the supporting communication network; and
  for transport layer protocols that do not have a MSS, fragmenting datagrams to be transmitted by the UE, as needed, to avoid packet fragmentation in an uplink between the UE and the supporting communication network.

* * * * *